US012447656B2

(12) United States Patent
Spooner et al.

(10) Patent No.: US 12,447,656 B2
(45) Date of Patent: Oct. 21, 2025

(54) MATERIALS AND METHODS

(71) Applicant: QinetiQ Limited, Farnborough (GB)

(72) Inventors: Christopher Douglas James Spooner, Bracknell (GB); Lyn David Jones, Fleet (GB); Lloyd Morris Wye, Farnborough (GB)

(73) Assignee: QINETIQ LIMITED, Hampshire (GB)

( * ) Notice: Subject to any disclaimer, the term of this patent is extended or adjusted under 35 U.S.C. 154(b) by 96 days.

(21) Appl. No.: 18/274,171

(22) PCT Filed: Jan. 20, 2022

(86) PCT No.: PCT/EP2022/051168
§ 371 (c)(1),
(2) Date: Jul. 25, 2023

(87) PCT Pub. No.: WO2022/161835
PCT Pub. Date: Aug. 4, 2022

(65) Prior Publication Data
US 2024/0424720 A1 Dec. 26, 2024

(30) Foreign Application Priority Data
Jan. 28, 2021 (GB) ...................................... 2101160

(51) Int. Cl.
*B29C 44/42* (2006.01)
*B29C 44/34* (2006.01)
*B29L 31/34* (2006.01)

(52) U.S. Cl.
CPC ........ *B29C 44/428* (2013.01); *B29C 44/3415* (2013.01); *B29L 2031/34* (2013.01)

(58) Field of Classification Search
CPC ............... B29C 44/428; B29C 44/3415; B29L 2031/34
See application file for complete search history.

(56) References Cited

U.S. PATENT DOCUMENTS

| | | | |
|---|---|---|---|
| 2006/0097544 A1* | 5/2006 | Cowelchuk | ......... B29C 45/1676 296/146.7 |
| 2016/0279841 A1* | 9/2016 | Fitzpatrick | .............. B29C 45/23 |
| 2017/0157820 A1* | 6/2017 | Ward | ..................... B29C 45/164 |
| 2018/0361635 A1 | 12/2018 | Montague, II et al. | |
| 2021/0008767 A1* | 1/2021 | Chen | ....................... B29C 45/77 |
| 2022/0314590 A1* | 10/2022 | Spooner | ............ B29C 66/73116 |

FOREIGN PATENT DOCUMENTS

EP 0242191 10/1987

OTHER PUBLICATIONS

Intellectual Property Office, Search Report mailed Nov. 9, 2021, issued in connection United Kingdom Patent Application No. GB2101160.6, 3 pages.

(Continued)

*Primary Examiner* — Abbas Rashid
*Assistant Examiner* — Elisa H Vera
(74) *Attorney, Agent, or Firm* — McDonnell Boehnen Hulbert & Berghoff LLP

(57) ABSTRACT

A method of forming a shaped foamed polymer article (16) and articles obtained from said method.

26 Claims, 6 Drawing Sheets

(56) References Cited

OTHER PUBLICATIONS

International Searching Authority, International Search Report and Written Opinion, mailed May 3, 2022, Issued in connection with International Patent Application No. PCT/EP2022/051168, filed Jan. 20, 2022, 11 pages.

Lichtenecker et al., "Die Herleitung des logarithmischen Mischungegesetzes aus allgemeinen Prinzipien der stationaren Stromung", Phys. Zeitsch, 1938, pp. 255-260, vol. 32 (with English translation).

Lichtenecker et al., Mischkorpertheori als Wahrscheinlichkeitsproblem, Phys. Zeitsch, 1929, pp. 805-809, vol. 30, (with English translation).

* cited by examiner

MATERIALS AND METHODS

The present application is a national stage entry of PCT/EP2022/051168 filed on Jan. 20, 2022, which claims priority to Great Britain Patent Application No. 2101160.6 filed Jan. 28, 2021, the contents of each of which are hereby incorporated by reference.

FIELD OF THE INVENTION

The present invention relates to a method for forming shaped articles. More specifically, the present invention relates to a method for forming shaped articles wherein the article is in the form of a foamed polymer and wherein at least some of the properties of the polymer are non-variant or substantially non-variant across the entire, or across substantially the entire, volume of the shaped foamed polymer. The present invention also relates to shaped articles obtainable from said methods, for example Radio Frequency (RF) products made in high volume/low cost; lenses, radomes, printed circuit boards and antenna encapsulants.

BACKGROUND OF THE INVENTION

Polymer foams are used in a wide variety of applications such as packaging and insulation. Polymer foams are made up of a solid phase and gas phase mixed together to form a foam. The resulting foam has a polymer matrix with voids, for example air bubbles and/or air tunnels, incorporated in it. These may be referred to as closed cell or open cell structures depending on the arrangement of the voids. The gas that is used in the foam is termed a blowing or foaming agent and may be chemical or physical in nature. Physical blowing agents are gases that do not react chemically with the foaming process and are therefore inert to the polymer forming the matrix. Chemical blowing agents are chemicals that take part in a reaction or decompose giving off chemicals in the process.

Polymers may be filled with filler materials (e.g. particulate or fibrous) in order to tailor the properties of the polymer or simply in an attempt to use filler material in order to save on the use of polymer which tends to be more expensive than filler material. In these circumstances, it is desirable if the filled polymer exhibits at least broadly comparable properties to the unfilled polymer and preferably improved properties.

It can be difficult to provide a foamed shaped polymer wherein at least some of the properties of the polymer are non-variant or substantially non-variant across the entire, or across substantially the entire, volume of a (filled) foamed polymer. This may particularly be the case when the polymer is processed during certain additive techniques such as injection moulding, as opposed to subtractive techniques such as machining shapes from a larger sheet of foam which has significantly higher cost implications.

Materials which possess consistent properties across their entire volume or across substantially their entire volume may be required when used in Radio Frequency (RF) products. RF products are generally taken to mean devices or products which operate in the radio wave region of the electromagnetic spectrum, with wavelengths longer than infrared light. They have frequencies from about 3 kHz to about 300 GHz, and corresponding free space wavelengths from about 100 km to about 1 mm. More recently the terahertz frequency domain is being used. Terahertz is typically defined as the frequency range of 100 GHz to 30 THz with corresponding free space wavelengths of 3 mm to 0.01 mm. Particular types of lens may also operate within this range of the spectrum. Examples of RF products include multilayer products such as radomes, RF lenses (e.g. a Luneburg lens), retro-reflectors, RF waveguides, RF filters, RF resonators, metamaterial structures, refraction structures, diffraction structures, or scattering structures.

More specifically, some applications may require the dielectric constant (or permittivity) to be non-variant throughout (or across the volume of) an article or part thereof. For example, in some applications it may be required that the permittivity is non-variant, as changes to the permittivity can give rise to changes in the associated RF properties. In a multilayer structure, it may be desirable to achieve this non-variance across all of the layers, some of or more than one of the layers, at least one of the layers, or just one of the layers. Other properties which may be required to be non-variant include permeability, thermal conductivity, density, porosity, or coefficient of thermal expansion.

There is an ongoing need for polymers which possess an intrinsic dielectric constant, (or real relative permittivity), of less than 2.0 and, optionally, a low loss tangent (e.g. <0.002). Further, there is a need to be able to make materials or products with certain properties, including those discussed above, using cost effective techniques which allow for high throughput. Examples of such products include the afore-mentioned RF products, shaped products in general, multilayer products, lens structures and the like.

Injection moulding is a relatively low cost scalable technique for making the various parts of a product, including products for which the requirements are quite stringent.

Blowing or foaming agents have been used in connection with injection moulding to make foamed polymers and typically a chemical blowing or foaming agent is used such as azodicarbamide ($H_2NC(O)N=NC(O)NH_2$). The blowing agent decomposes on account of the heat associated with the injection moulding technique to produce a gas such as nitrogen, carbon monoxide, carbon dioxide, ammonia, and/or water which will dissolve into the polymer during the injection moulding process, (typically at the high pressures the polymer is subject to at the barrel compression stage of the injection moulding process). The gas and/or water then expand when the polymer is injected into the low or lower pressure of the mould cavity giving rise to voids which solidify to form a foamed polymer. The voids are typically spherical in shape or essentially spherical.

However, there are a number of disadvantages associated with such an injection moulding technique. For example, a product or shaped article or part thereof formed using injection moulding will typically possess a thick skin of solid polymer at the surface of the mould tool, i.e. a volume of polymer with no voids present or significantly fewer voids when compared with the rest of the polymer. The presence of such a skin may potentially be advantageous in some applications, however this is not the case for all applications. The presence of the polymer skin means that areas of the polymer will possess a higher density which can, for example, result in a significant variance of properties, such as permittivity, across the volume of the polymer.

The present inventors have identified that, inter alia, it would be beneficial to be able to make a mouldable foam material in order to facilitate the economical manufacture of shaped articles or parts thereof which possess a dielectric constant of less than 2.0, for example about 1.5 or less and with a loss tangent of <0.002 across the entirety thereof. The present inventors have also found that for a target dielectric constant of around 1.5 a volume fraction of polymer and air of about 40 to 60 vol % would be beneficial which equates to a (filled) foam density of about 250 g/L to about 500 g/L (including for lower density polymers such as the polyolefins, e.g. polyethylene and polypropylene). Reference may be made to the volumetric mixture laws such as those described by Lickteneker et al in K. Lichtenecker: Mischkorpertheori als Wahrscheinlichkeitsproblem. Phys. Zeitsch. Vol. 30, 1929:805-809, and K. Lichtenecker and K. Rother: Die Herleitung des logarithmischen Mischungegesetzes aus allgemeinen Prinzipien der stationaren Stromung. Phys. Zeitsch, vol. 32, 1938:255-260 the contents of both of which are hereby incorporated by reference in their entirety. Existing foams made using low cost shaped moulding processes typically possess densities significantly outside the required range of 250 g/L to about 500 g/L range. Densities in this range are commercially available in sheet stock, which can be machined to shape. However, this subtractive process is typically costly, leaves a significant porous friable surface prone to contamination in service and sheet stock materials are typically made from thermosetting polymer which have loss tangents higher than the <0.002 required.

SUMMARY OF THE INVENTION

In order to address at least some of the afore-mentioned problems, it is an object of the present invention to provide a method of forming a shaped article which comprises (or consists of) a foamed polymer, wherein the foamed polymer comprises a number of voids which are distributed across the entirety of the polymer.

The method in accordance with the invention provides shaped articles comprising or consisting of foamed polymer wherein the polymer does not comprise a polymer skin, i.e. the voids are distributed throughout the entirety of the polymer.

In addition, the present invention seeks to provide a method of forming a shaped foamed polymer article wherein one or more properties are non-variant throughout, or substantially non-variant throughout, the volume of the article in its entirety, or of a part making up the article which can be identified as a constituent and a distinct part (for example, one layer in a multilayer structure of said article). Such a property may be the dielectric constant or complex permittivity or more specifically the real component of relative permittivity. By non-variant it may be taken to mean that the mean value of the property in question (e.g. permittivity) may vary between a range of 0 to 30% over a volume scale suitable to take the meaning or value of said property (i.e. ≥one tenth of wavelength scale, or a large enough number of void cells), including all values in between 0% and 30%, for example 5 to 30%, or 10 to 30%, or 5 to 10%, optionally up to 5%, or up to 2% or up to or less than 0.5%). The property may not vary (i.e. by 0%) at any point where the article or part thereof is measured compared to any other point on the article or part thereof.

Accordingly, in a first aspect the present invention provides a method of forming a shaped foamed polymer article in a mould tool system from a polymer composition, wherein:
  said polymer composition comprises a polymer and a foaming agent;
  said mould tool system comprises a core part and a cavity part;
  said core port and cavity part are engaged with one another to form a mould cavity, further wherein said method comprises:
  heating the polymer composition to a temperature at or above the melting temperature of the polymer composition to form a foamed polymer composition;
  heating the mould cavity to a temperature at or above the melting temperature of the foamed polymer composition;
  feeding the heated foamed polymer composition into the mould cavity;
  cooling the mould cavity to a temperature below the melting temperature of the foamed polymer composition.

Following the completed formation of the shaped article it may be further cooled, for example to room temperature (e.g. to about 15-25° C., e.g. about 20° C.).

The foaming agent is dispersed within the polymer. As such, the polymer may be referred to herein as the host polymer. The polymer composition may therefore comprise, or consist of, or consist essentially of, a polymer which has dispersed therein one or more foaming agents. The foamed polymer composition may comprise, consist of, or consist essentially of a foamed polymer. The polymer may be a single polymer or a blend of polymers.

When the polymer composition is heated to a temperature at or above the melting temperature of the polymer composition to form a foamed polymer composition, the foamed polymer composition may be described as being molten or in a molten state. The volume of the mould cavity may be varied by moving one or both of the core part and the cavity part relative to each other. During the formation of the shaped foamed polymer article, the volume of the mould cavity is typically fixed and not varied. The foamed polymer composition is typically fed into the mould cavity continuously, until the shaped foamed polymer article is formed. The foamed polymer composition is typically fed into the mould cavity at a controlled rate, e.g. a non-varying or substantially non-varying rate until the shaped foamed polymer article is formed. The pressure within the molten foam polymer composition may be controlled, for example by controlling the flow length. The flow length is the length the melted polymer must flow from the entrance to the mould tool system to reach the extremity of the mould cavity divided by the section thickness along that flow length. Prior to the polymer composition being fed into the mould cavity it is at least partially foamed. Foaming of the polymer composition continues as it enters the mould cavity and after it is has entered the mould cavity. Partially foamed may be taken to mean that the polymer composition has not completed the formation of voids, i.e. the foaming process is still capable of continuing in order to form further voids in the polymer and/or for existing voids to increase in volume and/or change shape.

Following the completed formation of the shaped article, it may be removed or released from the mould cavity, for example by separating the core part and the cavity part. The shaped article may be removed or released from the mould cavity by one or more pins located in the mould cavity which are activated to press against the shaped article so that it is moved away from the surface of the mould cavity. These pins are typically referred to as ejector pins.

Heat may be applied directly and/or indirectly to the mould cavity. The mould cavity may be heated using one or more of electro thermal heating, heated fluid which may flow through channels in the mould tool system.

In a second aspect, there is provided a shaped foamed polymer article obtainable from a method in accordance with the first aspect of the present invention. The shaped foamed polymer article comprises or consists of a foamed polymer. The shaped foamed polymer article may be characterised by the absence of a polymer skin. A polymer skin is a part of the foamed polymer which does not comprise any voids or significantly fewer voids when compared to the rest of the shaped foamed polymer article and is located on at least one surface of the polymer article.

In a further aspect, there is provided a shaped foamed polymer article per se which is described in accordance with any of the aspects or embodiments in accordance with the present invention.

This absence of a polymer skin provides a foamed polymer where the variance of one or more properties across the entire volume of the foamed polymer is decreased when compared with conventional foamed polymers not made in accordance with the present invention. By non-variant it may be taken to mean that the property (e.g. permittivity) does not vary (i.e. by about 0% to about 30%, for example 5 to 30%, or 10 to 30%, or 5 to 10%, optionally up to 5%, or up to about 2%, or up to or less than 0.5%) at any point where the article or part thereof is measured compared to any other point on the article or part thereof. Said property may vary by less than 0.1% or by 0%. The property may be non variant on account of the density of the article or part thereof not varying. The shaped foamed polymer article in accordance with the present invention, or a part thereof, may possess an intrinsic dielectric constant (dk), (or real relative permittivity), of less than about 2.0 (for example about 1.5) and, optionally, a low loss tangent of less than about 0.002.

For ease of reference, the polymer referred to in the various aspects of the invention may be referred to herein as the host polymer. Also for ease of reference, the shaped foamed polymer article may be referred to herein as the shaped article or the finished shaped article as appropriate.

The foamed polymer composition fed into the mould cavity may be referred to as the shot. At the point of being fed into the mould cavity, the polymer is typically only partially foamed, i.e. the foaming process is not complete and further voids will form in the polymer and/or existing voids increase in volume and/or change shape after it is fed into the mould cavity.

The shaped article made in accordance with the present invention may be formed in an extrusion moulding technique. The cavity in which the shaped article is formed is referred to herein as a mould cavity. However, other terms include mould tool cavity, shaped tool cavity, or tool cavity.

The polymer (or host polymer) is a thermoplastic polymer. Any reference to the polymer herein may be taken to include reference to the host polymer and vice versa. The thermoplastic polymer may be selected from one or more of a number of polymers. Any of the polymers mentioned herein for use in the present invention may be a homopolymer or a copolymer. Any of the polymers referred to herein for use in the invention may be used singly, i.e. the polymer may consist of said polymer, or any of the polymers referred to herein may be mixed or blended in any combination. The polymer may consist essentially of any given polymer referred to herein.

The polymer may be selected from any thermoplastic polymer which is readily moulded and which has suitable melt processing temperature. Suitable examples for moulding are; Polyethylene (PE), e.g. High Density Polyethylene (HDPE), Polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

The polymer may be selected from polyolefin, for example mono-olefin polymers of ethylene, propylene, butene or the like, functionalized derivatives and physical blends and copolymers of the same. Typical examples of the polyolefin are polyethylene such as a low-density polyethylene (LDPE), linear low density polyethylene (LLDPE), medium-density polyethylene (MDPE), and high-density polyethylene (HDPE); polypropylenes such as polypropylene and ethylene-polypropylene copolymer; poly (4-methylpentene); polybutene; polyacrylate; ethylene-vinyl acetate copolymer; and mixtures thereof. The polyolefins may be obtained by polymerisation in a known way, e.g. by the use of a Ziegler catalyst, or obtained by the use of a single site catalyst such as a metallocene catalyst.

The polymer may be a copolymer or a homopolymer. The polymer may be in the form of a resin. The term resin may be taken to mean a polymer material, either solid or liquid, prior to its shaping in to the (finished) shaped article.

The polymer composition may comprise further components in addition to the polymer and foaming agent. For example, the polymer composition may comprise additives such as one or more flame retardants, one or more thermal stability additives, or one or more ultraviolet stabilising additives. The additives, if present, and foaming agent are comprised or dispersed in the host polymer.

A blowing agent is a type of foaming agent. The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate.

Another example of a type of foaming or blowing agent which is preferred for use in the method of the present invention is polymers (e.g. polymer spheres or polymer shells), which encapsulate a gas or more than one gas or a liquid or more than one liquid or a mixture of gas(es) and liquid(s). Essentially, the material contained within the polymer shell may be capable of forming a gas when used as a foaming or blowing agent, e.g. when activated. These polymer spheres may be referred to herein as polymer bubbles or polymer microspheres. Polymer microspheres are commercially available and sometimes marketed as a (light weight) filler and a blowing agent in one, and may also be referred to as thermoplastic microspheres. The encapsulated liquid or gas is the blowing agent and the polymer sphere (or shell) may act as a filler. The combination of the polymer sphere and encapsulated liquid or gas may also more generally be referred to herein as a blowing or foaming agent. In the method in accordance with the invention, and prior to moulding the polymer composition, polymer microspheres may be incorporated (e.g. compounded) into the host polymer. Therefore, the polymer microspheres may be compounded into the host polymer prior to the formation of the shaped article in a moulding technique. The polymer microspheres may be activated (i.e. expanded) at the host polymer's optimum melt processing temperature thereby increasing in size and cast into the polymer as small bubbles or voids.

The foam polymer composition is heated to a temperature so that the foam polymer composition melts or is molten. The precise temperature or temperature range will be dependent largely on the particular polymer which is used. It will also be affected by the presence of the other constituents present in the polymer composition and the relative amounts thereof.

The shaped article may be made from one part, or more than one part, one layer or more than one layer. The shaped article may be multi-layered.

Advantageously, the method in accordance with the present invention provides one or more of the following: density reduction of a shaped foamed polymer article up to about 80% when compared with foamed polymers prepared in accordance with traditional techniques; a homogeneity throughout the shaped foamed article (or part thereof); elimination or reduction of the presence of a polymer skin; or the retention of a very thin layer of skin. A very thin layer of solid polymer skin is typically less than 100 μm thickness, or of the order of 1 polymer microsphere diameter in thickness. Retaining such a very thin layer of skin may be advantageous for surface friability and for protecting against contamination while at the same time possessing a minimal effect on RF frequencies and terahertz frequencies (for example, frequencies from about 3 kHz to about 300 GHz and up to 30 THz).

The present inventors have found that shaped foamed polymer articles may be made using economical, high throughput techniques where the foamed polymer possesses voids across its entirety. Optionally, there may be present a polymer skin which is less than 100 μm in thickness, however preferably said skin is not present. The polymer skin, if present, is located at least on one outer surface of the foamed polymer. The polymer skin, if present may be less than 100 μm thick, or less than 50 μm thick, or less than 25 μm thick, or less than 10 μm thick, or less than 5 μm thick, or less than 1 μm thick.

DETAILED DESCRIPTION OF THE INVENTION (Host) Polymer

The (host) polymer is a thermoplastic polymer. As mentioned herein, any reference to the polymer may be taken to include reference to the host polymer and vice versa. The thermoplastic polymer may be selected from one or more of a number of polymers. Any of the polymers mentioned herein for use in the present invention may be a homopolymer or a copolymer. Any of the polymers referred to herein for use in the invention may be used singly, i.e. the polymer may consist of said polymer, or any of the polymers referred to herein may be mixed or blended in any combination. The polymer may consist essentially of any given polymer referred to herein.

The polymer may be selected from any thermoplastic polymer which is readily moulded and which has suitable melt processing temperature. Suitable examples for moulding are; Polyethylene (PE), e.g. High Density Polyethylene (HDPE), Polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimde (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

The polymer may be selected from polyolefin, for example mono-olefin polymers of ethylene, propylene, butene or the like, functionalized derivatives and physical blends and copolymers of the same. Typical examples of the polyolefin are polyethylene such as a low-density polyethylene (LDPE), linear low density polyethylene (LLDPE), medium-density polyethylene (MDPE) and high-density polyethylene (HDPE); polypropylenes such as polypropylene and ethylene-polypropylene copolymer; poly (4-methylpentene); polybutene; polyacrylate; ethylene-vinyl acetate copolymer; and mixtures thereof. The polyolefins may be obtained by polymerisation in a known way, e.g. by the use of a Ziegler catalyst, or obtained by the use of a single site catalyst such as a metallocene catalyst.

The polymer may be a copolymer or a homopolymer. The polymer may be in the form of a resin. The term resin may be taken to mean a polymer material, either solid or liquid, prior to its shaping in to the shaped article.

The polymer may be selected from one or more of polyethylene (PE) and polypropylene (PP). These polymers may be present as homopolymers or copolymers. The polymer or polymers may be present in low density or high density form. The host polymer may be selected from one or any combination of low density polyethylene (LDPE), linear low density polyethylene (LLDPE) and high density polyethylene (HDPE). The typical densities and mean molecular weight values are provided below for these polymers.

| PE type | Typical Density (g/cm$^3$) | Mean molecular weight (g/mol) |
|---|---|---|
| LDPE | 0.910-0.925 | <200,000 |
| LLDPE | 0.910-0.940 | <50,000 |
| HDPE | 0.941-0.965 | <50,000 |

The host polymer may be crosslinked after formation of the shaped article. Advantageously, cross-linking of the polymer may increase the service temperature and heat deflection temperature. By service temperature is meant the temperature at which the polymer is used in a particular application. An alternative term for service temperature is operating temperature.

Blowing or Foaming Agents

Any of the known blowing or foaming agents are suitable for use in the present invention. The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate. The blowing or foaming agent or agents are dispersed or distributed in the (host) polymer.

The present inventors have found that polymer bubbles or (thermoplastic) polymer microspheres are of particular use. A thermoplastic polymer which is essentially spherical, may form a container or shell for a gas or gases or liquid(s).

Above a critical onset temperature, the polymer shell softens, or more specifically its modulus reduces below a certain critical value at which the pressure of the gas or liquid within the shell causes the shell to expand to many times its original size. The polymer microsphere possesses an expansion temperature range. The polymer forming the shell may be the same type of polymer as the host polymer or it may be a different polymer. The gas contained in the polymer shell may be selected from one or more of oxygen, carbon dioxide, nitrogen, or an alkane. Examples of suitable alkanes are butane and pentane. In the present invention, pentane is preferred. Materials which are liquid at room temperature may also or alternatively be contained within the shell such as water, organic solvents and higher fraction alkanes.

The polymer microsphere may act both as a filler and a blowing agent. The polymer microsphere may be combined with other blowing or foaming agents, for example any one or combination of the blowing or foaming agents listed herein. The polymer microsphere may be combined with the (host) polymer, for example the polymer microsphere may be compounded in the polymer host.

The polymer shell or thermoplastic material may have a diameter of about 1 μm to about 50 μm prior to expansion, for example about 5 μm to about 20 μm, for example about 5 μm to about 10 μm. On heating, the volume may increase by a factor of about two to forty times. The polymer shell or thermoplastic material may have a wall thickness of about 0.1 μm to about 5 μm. On heating, this may decrease by a factor ranging from about five to about twenty times. Pre-expansion, the density of the polymer microspheres may be about 1000 kg/m$^3$. Post-expansion the density of the polymer microspheres may be around 5-40 kg/m$^3$.

Typically, the polymer microspheres are expandable between temperatures of about 70° C. to about 250° C., for example about 80° C. to about 235° C.

The shell of the polymer microsphere may consist of or comprise one or more polymers which may be homopolymer(s) or copolymer(s). For example, the polymer shell may consist of or comprise of: an acrylonitrile, (ACN), ethylene vinylacetate (EVA), Poly(methyl methacrylate) (PMMA), Polyvinylidene chloride (PVDC), including a homopolymer thereof or a copolymer thereof. A polymer whose monomer is suitable for suspension polymerisation which has suitable melt strength and melting temperature range compatible with the processing temperature of the host polymer may be used. A thermoplastic polymer may be used which possesses a suitable melting range to match that or substantially match that of the host polymer, plus suitable melt strength and elasticity to allow the polymer shell to expand and suitable chemistry to facilitate suspension polymerisation. The polymer microsphere may be in dry or wet form. The polymer microspheres may be compounded to form a masterbatch thereof, for example in the form of pellets. The polymer into which the polymer microspheres are masterbatched may be any one or more of the polymers referred to herein. The polymer constituting the shell of the polymer microsphere and the polymer of the masterbatch may be the same or different.

Examples of suitable commercially available filled polymer microspheres are the Expancel™ microspheres which are commercially available from Nouryon™. These thermoplastic microspheres encapsulate a gas. On heating, the gas expands and the shell softens resulting in a significant increase in volume of the microsphere. The microspheres are typically of the order of about 8-12 μm in diameter and on heating can expand up to about 40 μm in diameter. Prior to heating, the thickness of the shell may be about 2 μm and on heating this thickness may decrease to about 0.1 μm.

When polymer microspheres are used, the (host) polymer should preferably possess a suitably low melt viscosity in order that the resistance to the expansion of the microspheres is minimised. A low melt viscosity may be characterised by a high melt flow rate which is typically the measure of a known mass of polymer passing through an aperture of known dimensions in a given time under a constant force.

A melt flow rate for use in accordance with the present invention may be ≥20 g/10 min. In particular, such a melt flow rate when used with HDPE is preferred. Polypropylene possessing a melt flow rate of >20 g/10 min is also preferred, however higher melt flow rates are also suitable, e.g. up to about 100 g/10 min. The melt flow rate or melt flow index is measured in accordance with ISO 1133. A suitable example of a commercially available polymer is Dow 25055E HDPE or Sabic FPC100 PP.

The polymer microsphere may be selected so as to provide optimum expansion at the processing temperature of the (host) polymer. For example, for (host) polymers HDPE and PP this is typically in the range of about 200 to about 260° C. A suitable commercially available polymer microsphere is 980DU120 from Nouryon. This material possesses a particle size of 25-40 μm, a starting expansion onset temperature of 158-178° C., a maximum expansion temperature of 215-235° C., and a theoretical minimum expanded density of ≤14 kg/m$^3$. Another example of a suitable commercially available sample is Nouryon 980MB120 which is 980DU120 compounded into EVA (host) polymer, e.g. in the form of pellets.

The expansion onset temperature, or expansion onset temperature range, is when the polymer microsphere shell starts to soften so it becomes pliable enough to begin stretching. The maximum (expansion) temperature, or maximum (expansion) temperature range is the temperature at which the polymer microsphere shell begins to melt, and the melt strength decreases and the shell may burst.

The amount of foaming agent (e.g. polymer microspheres) present in the polymer composition may be about 0.5 wt % to about 10 wt % or about 3 wt % to about 7 wt % based on the total weight of the polymer composition plus any other materials present (including the foaming agent) in said polymer composition. These ranges are based on the polymer microspheres in dry powder form and not when masterbatched or compounded.

The gas encapsulated by the thermoplastic polymer shell may provide an increase in volume which is up to forty times that of the unexpanded shell when heated to the processing temperature. Organic gases may be used, including pentane. Liquids may also be used.

The polymer microspheres may be manufactured using the suspension polymerisation processing technique. In this technique, an organic phase, consisting of monomers, blowing agent, initiator and a cross-linker, is mixed with a water phase consisting of water, colloid and surfactant. Through vigorous agitation, small monomer droplets form in the water phase forming an emulsion. The polymerization reaction is then initiated by heating, transforming the monomer droplets into thermally expandable microspheres. The droplets are stabilized by the colloid, for example either flocculated silica or Mg(OH)$_2$, and a surfactant.

Compounding

The (host) polymer may be filled by methods in which a foaming agent (which may be referred to in this section as a filler material) and a polymer resin are mixed together in suitable ratios to form a blend (so-called "compounding").

The polymer resin may be in a form (e.g. liquid form) to enable the filler material (or foaming agent) to be dispersed therein. Where the polymer resins are solid at ambient temperatures, the polymer resin may need to be melted before the compounding can be accomplished. In some embodiments, the foaming agent may be dry blended with particles of the polymer resin.

The polymer resin, the foaming agent (e.g. polymer microspheres), and if necessary, any other optional additives (such as flame retardants), may be formed into a suitable masterbatch by the use of suitable mixing equipment in a manner known per se. Twin Archimedes screw extruders are typically used in the polymer compounding and masterbatch industry. The masterbatch may be pelletized, e.g. by the use of a single screw extruder or a twin-screw extruder which forms strands which may be cut or broken into pellets. The compounder may have a single inlet for introducing the filler/foaming agent and the polymer resin together and any other constituents. Alternatively, separate inlets may be provided for the filler/foaming agent and the polymer resin plus any other necessary constituents or additives. Suitable compounders are available commercially, for example from Coperion (formerly Werner & Pfleiderer). Preferably, the polymer composition used in accordance with the present invention is prepared prior to moulding.

In accordance with the present invention, the polymer microspheres in the form of pellets (e.g. 980MB120) may be mixed with the host polymer in the form of pellets (e.g. HDPE pellets) e.g. by simple tumble methods at a ratio of about 0.7-16% or 4-10% by weight before being added to the feedstock hopper of a moulding machine.

By way of example, commercially available 980DU120 from Nouryon would typically need to be pre-compounded into HDPE at about 3-6.5% by weight.

A small amount of mineral oil may be required to compound the polymer microsphere effectively whilst maintaining the processing temperature below the expansion onset temperature of the polymer microspheres. Such formulations typically expand to densities in the range of 30-100 g/L when purged from the end of the mould machine extruder barrel at atmospheric pressure.

Methods of Forming the Shaped Article

The shaped article in accordance with the present invention is preferably formed using an extrusion moulding technique. Alternative methods, include the use of a pump such as a peristaltic pump or a centrifugal pump and the like.

By way of comparison, injection moulding is a manufacturing process for producing parts by injecting molten material into a mould. Material for the part is typically fed into a heated container (e.g. a barrel), mixed (typically using a helical shaped screw) and injected or forced into a mould cavity where it cools and hardens to the configuration of the cavity. The mould may be made from metal such as steel or aluminium and precision machined to form the features of the desired part. Injection moulding is ideal for producing high volumes of the same object.

Aluminium moulds are less well suited for high volume production or parts with narrow dimensional tolerances as they tend to have inferior mechanical properties and are more prone to wear, damage and deformation during the injection and clamping cycles. However, aluminium moulds are cost effective in low volume applications as mould fabrication costs and time are considerably reduced. Aluminium also has a higher thermal conductivity than steel and so aluminium moulds can be heated and cooled more rapidly than steel moulds. Many steels moulds are designed to process well over a million parts during their lifetime though tend to be more expensive.

Typically, injection moulding uses a ram or screw-type plunger to force molten plastic material under high pressure into a mould cavity or tool cavity. This solidifies into a shape that has conformed to the contour of the mould. Injection moulding is suitable for processing both thermoplastic and thermosetting polymers. Thermoplastics are highly suitable for injection moulding such as the ease with which they may be recycled, their versatility allowing them to be used in a wide variety of applications, and their ability to soften and flow upon heating. Moulds may be of a single cavity or multiple cavities.

When thermoplastics are moulded, typically pelletized polymer or polymer composition is fed through a hopper into a heated barrel with a reciprocating screw. Upon entrance to the barrel, the temperature increases and the viscosity is reduced enabling the polymer to flow with the driving force of the injection unit. The screw delivers the raw material forward, mixes and homogenises the thermal and viscous distributions of the polymer, and reduces the required heating time by mechanically shearing the material and adding a significant amount of frictional heating to the polymer. The material feeds forward through a check valve and collects at the front of the screw into a volume known as a shot. A shot is the volume of material that is used to fill the mould cavity and provides a cushion to transfer pressure from the screw to the mould cavity. When enough material has gathered, the material may be forced at high pressure and velocity into the part forming cavity. To prevent spikes in pressure, the process typically uses a transfer position corresponding to a 95-98% by volume full cavity where the screw shifts from a constant velocity to a constant pressure control. Often, injection times are well under one second. Once the screw reaches the transfer position the packing pressure is applied until the gate or cavity entrance solidifies. Due to its small size, the gate is normally the first place to solidify through its entire thickness. Once the gate solidifies, no more material can enter the cavity and accordingly the screw reciprocates and acquires material for the next cycle while the material within the mould cools to a temperature at which the part is dimensionally stable and enough to be ejected from the tool cavity. Once the required temperature has been achieved, the mould opens and an array of pins, sleeves, strippers are driven forward to demould or release the article. Then the mould closes and the process is repeated.

For a so-called over-moulding or multi-shot moulding, two or more separate materials are incorporated into one part. This is achieved by a number of moulding stages in successively bigger tool cavities, each additional shot filling the increased cavity volume over the previous stage and solidifying on the surface of the previously solidified shot. In over-moulding, the solidified part from the first shot is positioned in a new tool as an insert and another shot moulded over it. In multi-shot moulding the part remains in one half of the first tool and a second larger cavity is positioned over it into which the second shot is moulded and so on. This type of injection moulding is useful in providing a product possessing multiple colours or in producing a part with multiple performance characteristics.

Pre-moulded or machined components can be inserted into the cavity while the mould is open, allowing the material injected in the next cycle to form and solidify around them. This process is known as insert moulding and allows single parts to contain multiple materials.

Injection moulding is advantageous over other moulding techniques for a variety of reasons, including a lower cycle time and improved process control. However, the polymer entering a mould cavity in an injection moulding process typically freezes instantly on the surface of the tool, as said surface is significantly lower in temperature than the melt temperature of the polymer. The injection pressure continues to shear liquid polymer in the core of the part section across the solidified faces and the additional shear heat partially re-melts the solidified surfaces; creating a boundary layer in equilibrium due to the heat being conducted out through the tool and the additional heat energy being provided by shear. For the production of routine shaped (foamed) polymer articles and for which there may be tolerated a significant variance in the properties across the volume of the polymer this may not be particularly problematic.

However, in connection with the formation of foamed polymers in accordance with the present invention, this mechanism prevents the expansion of voids at the surface of the part being moulded, due to the almost instantaneous freezing of the polymer under high injection pressure which, at least for the case when polymer bubbles are used as the foaming or blowing agent, does not allow sufficient time or a low enough pressure condition whilst the host polymer is molten for adequate void formation. The present inventors have also found that the discontinuous nature of the extrusion in an injection moulding machine which conveys foam polymer composition into the mould is sub-optimal for providing the consistent conveyance rate of foam polymer composition which will allow for controlled density and properties throughout the volume of the shaped foam article. Pressure changes throughout the process and shot volume being injected lead to variations in blowing agent expansion and corresponding density which is frozen into the solidified part. The use of known injection moulding techniques, valves such as check valves and gate valves would typically lead to blowing agent voids being crushed and/or polymer microspheres being damaged which leads to regions of solid host polymer being frozen into the subsequent shaped article moulded in the process.

The present invention addresses this problem by using an extrusion foam moulding technique which allows a homogeneous foam to be moulded with controlled density and therefore affords controlled or tailored dielectric properties throughout its volume which can then be used for precision RF applications. Furthermore, by using the method in accordance with the present invention, the dielectric properties of a given polymer can be reduced. For example, the method in accordance with the present invention provides a moulded foam using polymer microspheres (e.g. Expancel polymer microspheres which are commercially available) in a thermoplastic host polymer. The extrusion foam moulding technique of the present invention may use a twin or single Archimedes screw extruder to first melt solid polymer composition in the form of pelletised feedstock to form an at least partially foamed polymer or polymer composition and then convey it along the length of an extruder barrel and out of a shaped die at the end of the barrel at a controlled volume rate.

Such equipment is widely used for compounding (whereby two or more constituents of a polymer formulation are mixed together and subsequently used as a feedstock into the polymer processing industry), or moulding of extrusions. Extrusions are typically used for components which have constant cross section and are physically larger in the direction normal to this cross section (length). The geometry is controlled in the two dimensions of the cross section by the shape of the die and is constant down the length of the part. Doubled glazed window surrounds, rod stock and foam sheets are examples of extruded products.

The rate of foam polymer composition extrusion is controlled by the screw rotation speed and the geometry of the screw flights (screw diameter and screw flight depth leading to a cross sectional area along which the polymer can be conveyed). Twin screw extruders are considered superior to single screw extruders in control of conveyance rate. The density of the (partially) foamed polymer composition containing bowing agents is then controlled by the temperature and pressure conditions inside the extruder barrel which defines the ratio to which the blowing agent can expand before it exits the extruder die. This density is controlled by barrel temperature and screw and barrel geometry along the length of the barrel which are machine controlled parameters. In this way a controlled mass rate of foam polymer composition can be extruded out of the extruder die.

By positioning, (e.g. abutting), the mould cavity inlet port (referred to herein as the gate) onto the extruder outlet die the present invention allows for the mould cavity to be filled at a controlled volume rate and mass rate. Control of the shaped article density is then afforded by control of the length of time the mould is connected onto the extruder die and the mould cavity is allowed to fill before the mould is removed. In accordance with the present invention the mould is preferably moved using a digitally controlled mechanism which can move the mould towards and away from the extruder die and clamp it in place during mould cavity filling. In this way, fill time can be accurately controlled.

The extruder screws are preferentially continuously rotated and not stopped and started between moulding cycles in accordance with the present invention. This allows for a continuous extrusion of foam polymer composition through the extruder and provides the required control of volume and mass conveyance rate into the mould cavity. It does lead to the requirement for the extruder to purge scrap foam polymer composition out of the extruder die between moulding cycles (i.e. during the time period between removing the first mould tool to be moulded and positioning the next mould tool). The axis of rotation of the screws in a single or twin screw extruder are typically horizontal and the mould tool moves towards and away from the extruder die along an axis of movement which is coincident to the rotational axis of the extruder screws. Thus purged foam polymer composition simply falls towards the ground under the action of gravity between moulding cycles and may be captured in a scrap container beneath. Waste due to the purge scrap can be minimised by ensuring mould tools can be cycled rapidly in front of the extruder die between mould filling stages.

In order to cycle the mould tool rapidly in front of the extruder die a rotary tool carousel may be used in a production environment. The carousel may rotate on a horizontal plane around the central axis of the extruder screws and hold a number of mould tool stations (the number of stations required being governed by the total cycle time of the process to ensure tools can continuously be presented to the extruder die for mould filling with minimal purge time between moulding cycle). If the carousel is rotated rapidly to cycle adjacent mould tools with a small down time between each mould filling stage, the scrap rate from extruder purging is negligible. The continuous nature of the extrusion overcomes the limitations of previous injection-compression techniques which result in some solid/high density un-foamed regions.

The present inventors have found that the mould cavity surface should be heated to a temperature close to, e.g. at, or more preferably greater than the melting temperature of the foamed and/or foaming polymer (composition). As the foam polymer composition enters the empty volume of the mould cavity the blowing agent expands. As the pressure, volume and temperature of a gas in a closed system are related, the expansion of gas leads to a rapid cooling of the foam polymer composition melt. This cooling leads to an increase in viscosity within the foam polymer composition melt or solidification of the foam polymer composition. The viscosity of the foam polymer composition is preferentially minimised at all times during mould cavity filling as it leads to increased force requirements to convey the foam polymer composition into the mould cavity. This increased force acting at the entrance port to the cavity (the gate) leads to a pressure differential along the flow length of the cavity, i.e. the path which the melt must follow from the gate to the furthest point of the cavity from the gate. The blowing agent counteracts the pressure generated by conveyance in order to expand and so the pressure differential leads to a differential in void size from the gate to the furthest point of the cavity and a corresponding gradient in density and/or material properties. If the foam polymer composition cools enough to solidify at any position in the mould cavity it will prevent any further foam polymer composition from filling the cavity beyond that position and the shaped article will not be fully formed. The present inventors have found that by heating the surface of the mould cavity to the melting temperature of the foam polymer composition, or above that, the decrease in melt temperature and corresponding increase in viscosity can be delayed until the foam polymer composition has fully filled the mould cavity. The mould tool system may then be removed from the extruder and the conveyance pressure no longer acts on the foam polymer composition which remains liquid for some time after the release of pressure. This allows the foam polymer composition to continue to flow, which allows the blowing or foaming agent to fully expand and pressure differentials from the mould fill stage to equalise. This is evidenced by excess material purging from the gate of the mould cavity after removal from the extruder die as the blowing agent continues to expand inside.

The present inventors have found that a dominant processing parameter may be the component section thickness. The present inventors have also found that a maximum flow length ratio; akin to that adhered to in injection mould tool design, is preferably required in order to ensure adequate foam formation and homogeneity within the part and ultimately the shaped article. As the melt enters the mould cavity and begins to fill, the extruder should exert a force on the melt to overcome the viscous forces within the melt. As previously described herein, the pressure in the melt builds along the flow length such that there is a low pressure condition at the flow front (corresponding to the furthest point of the cavity from the gate through which the melt enters the cavity), and a high pressure condition at the gate port and cavity region adjacent to it. If the melt was allowed to freeze under this pressure differential condition, the density of the foam would be higher near the gate (where the expansion pressure of the blowing agent has been counteracted leading to a lower level of microsphere expansion and foam formation), and lower at the extremity of the mould cavity, (where the pressure within the foam polymer composition is lowest leading to higher levels of blowing agent expansion and foam formation). The range of this pressure differential is dependent on how far the foam polymer composition must flow to fill the mould cavity. The flow length, taking a simple rectangular mould cavity shown in FIG. 5 as an example, is the length the polymer melt must flow from the gate port to reach the cavity extremity (L) divided by the section thickness along that flow length (T). As the component section thickness decreases, the flow length ratio increases and the pressure differential range and variation in density along that flow length also increases. The method of the present invention allows for some relief of this pressure differential to realise at least adequate homogeneity in the foam void structure, density and dielectric constant throughout the part volume. The lower volumetric fill rate afforded by extrusion moulding leads to a lower shear rate in the polymer melt and a correspondingly lower melt pressure. Advantageously, some relief of the fill pressure is afforded by the current invention. The present inventors have found that the method in accordance with the present invention is particularly effective using a section thickness of approximately 1.6 mm in a 60 mm diameter centre gated part (a flow length ratio of 18.75). Homogeneity increases with increasing section thickness and decreasing flow length ratio.

A mould cavity surface at the melting temperature of the foamed polymer composition or higher leads to the requirement to (rapidly) heat the tool before mould filling and then (rapidly) cool the tool below the melting temperature of the foamed polymer composition after mould filling. The temperature to which the tool should be cooled is preferentially a temperature below which the foamed polymer is rigid enough not to be deformed due to the forces during ejection of the shaped article from the tool. The temperature to which the mould cavity or mould cavity surface(s) should be cooled may be one or more of: below the melting temperature of the foamed polymer composition; below the Vicat softening temperature of the foamed polymer composition; below the heat deflection temperature of the foamed polymer composition; below the glass transition temperature of the foamed polymer composition. Typically, this is dependent on the properties of the (host) polymer or foamed polymer composition and the shape of the article being produced. In a production environment, this is typically achieved using rapid temperature control tooling which uses pressurised steam passed through cooling channels machined into the tool behind the cavity surface. The heat energy from the steam passes into the tool and is used to heat the tool and the pressure is subsequently reduced and the latent heat of evaporation of that steam used to remove heat energy from the tool in order to rapidly cool it once the moulding is complete. An example of such a system is the Rapid Isolation Heat and Cooling (RICH) system supplied by YUDO. The present inventors have also successfully demonstrated the use of electro thermal cartridge heaters embedded in the tool to heat it and compressed air to cool the tool, e.g. using compressed air vortex tube configurations.

The pressure within the mould cavity at the start of the mould filling cycle has not been found by the present inventors to have a large impact on foam quality; an atmospheric cavity pressure of about 1 bar provides adequate results. However, atmospheric gas within the mould cavity volume is preferably expelled during and/or before mould filling to make space for the melt being extruded into the mould cavity and prevent pressure build-up as the mould fills. Vented tooling is therefore recommended to allow this gas to be expelled during mould filling preventing build-up of pressure in the mould cavity due to trapped gas which would counteract the expansion pressure of the blowing agent and prevent adequate foam formation. Typical vent depths recommended for injection mould tools have been found to be adequate. For example, a vent depth of about 20 microns is typical, optionally for use with HDPE.

The shaped foam polymer articles can preferentially be over-moulded directly onto other thermoplastic polymer shaped article(s) made from the same (host) polymer or a different polymer which is compatible with the (host) polymer of the shaped foamed polymer article. This can be achieved by placing the shaped article to be over moulded into the mould cavity as an insert and when the foam polymer composition is conveyed into the mould cavity by the extruder it will flow into the volume between the insert and the mould cavity and come into contact with all exposed surfaces of the insert. The insert may comprise or consist of one or two or more than two layers of shaped polymer articles in itself. The mould tool may preferentially be designed with a receptacle or clamping mechanism to hold the insert in place during the over-moulding step. The surfaces of the insert which the foamed and/or foaming polymer composition comes into contact with during foam moulding will become the interface between the foamed polymer and the insert in the finished article. This surface should preferentially be at the melting temperature of the foamed polymer composition, or more preferably at a higher temperature than the melting temperature of the foamed polymer composition. If the host polymer of the insert material is the same as the host polymer of the foam polymer composition to be over-moulded then care must be taken not to melt and distort the insert before over-moulding. Preferably, the melt temperature of the insert (polymer) is the same or higher than the melt temperature of the foamed and/or foaming polymer composition. The present inventors have found that the surface of the insert can be rapidly heated using infrared heating elements before the over-moulding step or hot air. An infrared heating element (pre-heated by electro thermal heating to a temperature significantly higher than the surface temperature required of the insert) is brought into close proximity to the insert but not into direct contact with it (immediately) before the over-moulding step. The infrared element is held in this position for a length of time adequate to heat a thin surface layer of the insert to the required temperature to melt a thin surface layer of the insert. A thin layer may be about 100 µm to about 2 mm thick, for example about 200 µm to about 1 mm thick.

The insert is then placed in the mould tool, and the mould cavity (immediately) closed and the mould gate brought into contact with the extruder die to begin conveying the foam polymer composition into the cavity. If the insert is the same (host) polymer as the foamed polymer composition, the melting of the thin surface layer ensures a strong chemical bond is made between the insert and shaped foamed polymer article as they both cool back to room temperature after moulding. If the insert is made from a polymer of a higher melting temperature than the host polymer of the foamed polymer composition, then geometric features may be required on the surface of the insert to ensure the two shaped articles remain in contact after moulding. If the (host) polymer of the insert has a lower melting temperature than the (host) polymer of the foamed polymer composition it is not possible to over-mould the insert with foam according to the present invention. Hence, preferably the polymer insert does not have a lower melting temperature than the polymer of the foamed polymer composition which is fed into the mould cavity. The shaped article is then allowed to cool.

Uses of the Shaped Foamed Polymer Article

The shaped foamed polymer article formed in accordance with the present invention may be used in a range of applications. For example a radome. A radome is a structure placed over an antenna which protects the antenna from the physical environment outside of the enclosure formed by the radome and its housing. The radome is RF transparent over the operating frequency range of the antenna equipment enclosed within it in order to allow electromagnetic energy to propagate through it in both directions with low levels of signal attenuation. The radome material, i.e. polymer foam may possess an electrical section thickness (the combination of physical thickness and dielectric constant—or permittivity) which is of the order of half a wavelength in order to reduce the resonant absorption of the propagating signal. The present invention provides a low cost, high volume alternative to known techniques.

The polymer foams made in accordance with the present invention may be used in decreasing the weight and raw materials cost of polymer parts, for example thick section polymer parts which may be used for automotive and other mobility applications.

The polymer foams made in accordance with the present invention may be combined with thermoplastic polyurethane(s) or thermoplastic elastomer(s) and optionally other fillers for use in vibro acoustic control products, sound deadening and anti-vibration mounts.

The polymer foams made in accordance with the present invention may be used as insulation materials for use in buildings, the automotive industry, the aerospace industry, and mobility markets such as planes, trains and ships.

The shaped foamed polymer articles formed in accordance with the method of the invention may be suitable for use in a broad range of applications including: electronic or electromechanical sensors, encapsulation of printed circuit boards and electronics, acoustic sound dampening claddings and mounts, thermal insulation, multi-material enclosures and power tool components and pharmaceutical components such as prosthetics and implants.

The shaped foamed polymer articles formed in accordance with the method of the invention may be suitable for use in RF applications such as: RF lenses (e.g. a Luneburg lens), impedance matching layers, encapsulation for antennas, retro-reflectors, RF waveguides, RF filters, RF resonators, metamaterial structures, refraction structures, diffraction structures, or scattering structures.

BRIEF DESCRIPTION OF THE DRAWINGS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

Figure 1:
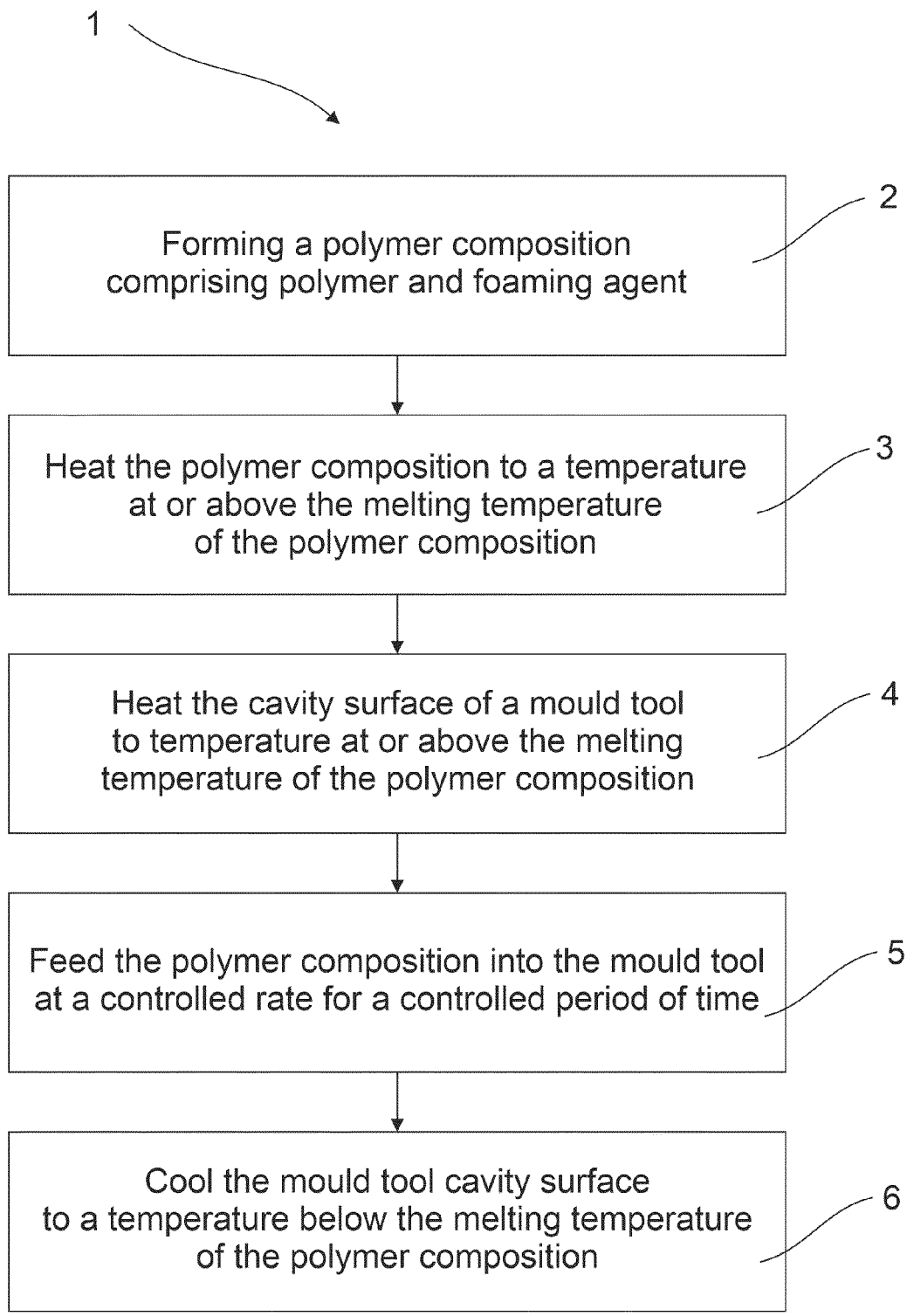
FIG. 1 shows a process flow chart in accordance with the present invention

The flow chart (1) depicted in FIG. 1 shows the extrusion foam moulding process in accordance with the present invention. The foam polymer composition comprising or consisting of host polymer and blowing agent is first mixed in the required mix ratios (2). Typically, dry pellets of the host polymer are used. The present inventors have had the greatest success achieving homogeneous foam void structures using polymer microspheres as the blowing agent. In accordance with the present invention, the polymer microspheres in the form of pellets (e.g. 980MB120) may be mixed with the host polymer in the form of pellets (e.g. HDPE pellets) by simple tumble methods optionally at a ratio of about 0.7-16% or 4-10% by weight before being added to the feedstock hopper of an extruder. The foam polymer composition is heated above the melting temperature of the host polymer (3) as it is conveyed through the extruder barrel by rotating Archimedes screw(s). At the same time, the mould tool cavity surface and insert component surface (if used) are heated to a temperature similar to or above the melting temperature of the host polymer or foamed polymer composition (4). The gate of the mould tool is then brought into contact with the outlet die of the extruder and (partially) foamed polymer composition is conveyed into the mould cavity at a controlled rate for a controlled period of time (5). The mould fill time, or time for which the mould is held in contact with the extruder die before being removed is chosen so as to convey only the required mass of material into the mould tool to fill the cavity volume fully to the mean density required of the shaped foam article but no longer so as to over pressurize the mould cavity and reduce the expansion of the blowing agent in the foamed polymer composition. When the required fill time has elapsed the gate of the mould is moved away from the extruder die so no further foam polymer composition can be conveyed into the mould cavity. The mould, mould cavity surface and shaped foamed polymer article is then cooled to a temperature below the melting temperature of the foamed polymer composition or host polymer (6). This temperature is below the melting temperature of the foamed polymer composition or host polymer to prevent deformation of the shaped foam article when it is removed from the tool cavity. Removal is typically accomplished by ejector pins; metallic rods fitted into holes machined in the mould tool and coincident to the mould cavity surface which are actuated mechanically and move in to the volume of the cavity once the mould has been opened to release a moulded part from the cavity surface. The ejector pins apply significant local forces to the shaped article which would distort the geometry permanently if the shaped article was not cooled to a low enough temperature to achieve adequate stiffness to resist this force. The temperature to which the shaped foamed polymer article is cooled may be below the melting temperature of the foamed polymer composition or host polymer, below the Vicat softening temperature of the foamed polymer composition or host polymer heat deflection temperature of the host polymer, or below the glass transition temperature of the foamed polymer composition or host polymer. The shaped foamed polymer article can then be ejected or removed from the tool cavity. The mould tool is then heated once more to a temperature similar or greater than the melting temperature of the foamed polymer composition or host polymer and a new insert component inserted (if used) ready for the next shaped foam article to be moulded.

Figure 2:
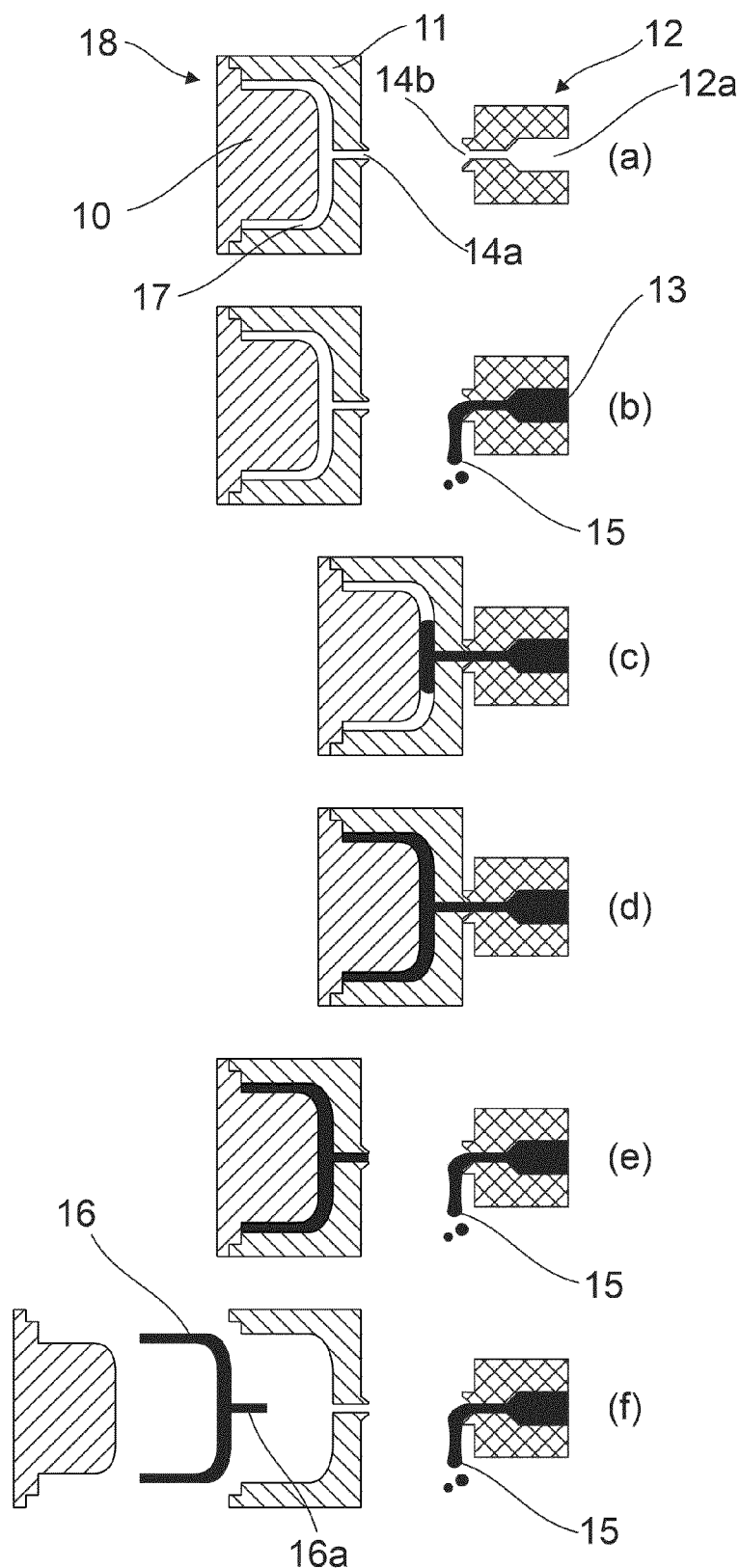
FIG. 2 shows a cross section of an example mould tool and how it is moved relative to an extruder during the moulding cycle in accordance with the present invention.

FIG. 2 shows the moulding steps in accordance with the present invention in more detail. No insert is being overmoulded in this example which moulds a shaped foam polymer article only. A mould tool is shown generally at (18) and an extruder die at (12). The extruder die (shown generally at 12) comprises a barrel (12*a*) and an exit opening thereof (14*b*) which may be shaped or adapted to incorporate a male or female conical feature which engages with the gate of the mould tool (14*a*) which is shown with an opposing male or female conical feature. The core part of the mould (10) and the cavity part of the mould (11) are first brought together to form the mould cavity (17) and to close the mould tool (18). The closed mould tool is shown in (a) in the vicinity of the extruder die (12). The mould tool (18) is then heated to a temperature close to or greater than the melting temperature of the foamed polymer composition or host polymer and the extruder barrel and die (12) heated to a temperature greater than the melting temperature of the foamed polymer composition or host polymer. Foam polymer composition (13) is then conveyed through the extruder in Step (b) and purged out of the extruder die (12). Purged foam polymer composition (15) falls out of the extruder die (12) under the force of gravity. The mould tool (18) is then brought into contact with the extruder die (12) in Step (c). The gate of the mould tool has a shaped male conical feature (14*a*) which fits into a matching female feature (14*b*) in order to self-align the mould tool as it is brought into contact with the extruder die. The foam polymer composition now begins to fill the mould cavity (17) of the mould tool. After a controlled period of time, the mould cavity (17) is fully filled with the foam polymer composition as shown in Step (d) at which time the mould tool (18) is retracted away from the extruder die (12) as shown in Step (e). The extruder continues to convey material out of the extruder die (12) so foam polymer composition now begins to purge again (15). The mould tool (18) and mould cavity surface is now cooled until the shaped article has reached a temperature below the melting temperature of the foamed polymer composition or host polymer and a temperature below which it is safe to remove the shaped foam article from the mould cavity without geometrical distortion. When the mould tool and shaped foam article are adequately cooled the core part of the tool (10) is removed from the cavity part of the tool (11) and the moulded shaped foamed polymer article (16) is removed from the mould tool. The shaped foam polymer article has a sprue (16*a*) which is the remnants of the foamed polymer composition which solidified into the gate of the mould. This may be removed subsequently by a secondary cutting or machining operation.

Figure 3:
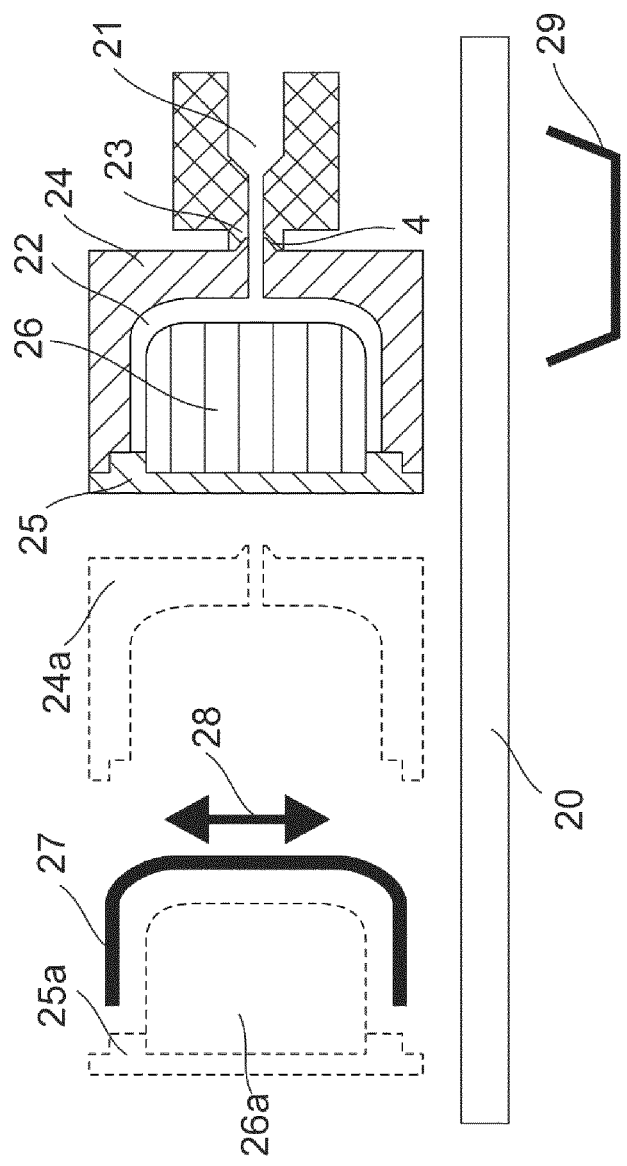
FIG. 3 shows a mould station architecture in accordance with the present invention.

FIG. 3 depicts an extrusion foam moulding station required to mould shaped foam articles in accordance with the present invention. Both the cavity (24) and core (25) tool parts are secured to a sliding bearing rail (20) which allows them to move towards the extruder die (23) as shown by the cavity part at position (24) and away from the extruder die as shown by cavity part at position (24a). This movement is along an axis of movement coincident with the central axis of the extruder barrel (21). In this example, the core part of the tool (25) is designed to accept an insert (26) in a suitably shaped receptacle machined into the core. The core part of the tool (25) can move independently to the cavity part of the tool (24) such that the mould tool cavity (22) can be opened and closed to place inserts into the core receptacle and to allow for removal of over-moulded insert and shaped foam article assemblies from the tool after moulding. The closed position of the core and insert is signified by (25) and (26) respectively and the open position of the core and insert is signified by (25a) and (26a) respectively. An infrared heating element (27) moves along an axis orthogonal to the central axis of the extruder barrel as shown by the arrow (28). The infrared element can thus be brought into close proximity (but not into contact with) the insert (26a) when the core (25a) is in the open position to heat the surface of the insert to a temperature close to or greater than the melting temperature of the host polymer. A container (29) is provisioned under the extruder die to catch any purged foam polymer composition which falls out of the extruder die under gravity between moulding cycles. The foam polymer composition which falls into this container can be considered as scrap. The extruder die (23) is machined into a female cone shape (4) which matches to a male cone shape machined into the gate of the cavity (24). In this way the cavity (24) self-aligns to the extruder die (23) as the cavity is moved into contact with the extruder die at the beginning of the mould filling stage. Once the mould cavity (24) has been brought into contact with the extruder die (23) a pressure is applied from the actuator which moves it into place in order to clamp the cavity into place during the mould cavity fill stage. This pressure does not need to be high. It only needs to be higher than the conveyance pressure applied by the extruder which is lower than the expansion pressure exerted by the blowing agent (which is approximately 6 bar in the case of polymer microspheres) to prevent leakage at the cavity/extruder die interface during mould filling. It can be seen by those skilled in the art that the features described in FIG. 3 are put to use in the example mould cycles described above and depicted in FIG. 1 and FIG. 2.

If the host polymer of the foam polymer composition in accordance with the present invention is HDPE and the host polymer of the insert component is also HDPE, the present inventors have found that the mould cavity surface temperature is preferentially about 140° C. or preferentially in the range 120° C. to 150° C. or preferentially greater than 120° C. or preferentially greater than 140° C. A temperature greater than 120° C. would melt the insert component before it could be over moulded and the geometry of the insert would be distorted. The present inventors have found that an insert surface temperature of 120° C. is adequate for HDPE mouldings (i.e. the cavity half of the tool preferentially has a surface temperature of 140° C. and the insert effectively forming the core half of the tool preferentially has a surface temperature of 120° C.). The present inventors have found that a core temperature of 80° C. can be used. The HDPE inserts are pre-heated to 80° C. An infrared heating element may then be used to rapidly heat the over-mould surface of the insert to 140° C. immediately before the foam polymer composition is over-moulded. This ensures the surface of the insert is at an acceptably high temperature to;

1) ensure adequate mould fill and foam formation or the foam polymer composition freezes as discussed above,
2) ensure a thin surface layer of the insert is molten at the point the foam polymer composition comes into contact with it during mould cavity fill. This allows for a strong molecular bond between the insert and foam parts once they have re-solidified.

Due to the low thermal conductivity of polymers, the present inventors have found that an acceptably high insert surface temperature can be realised without melting the insert component itself and leading to geometrical distortions.

Figure 4:
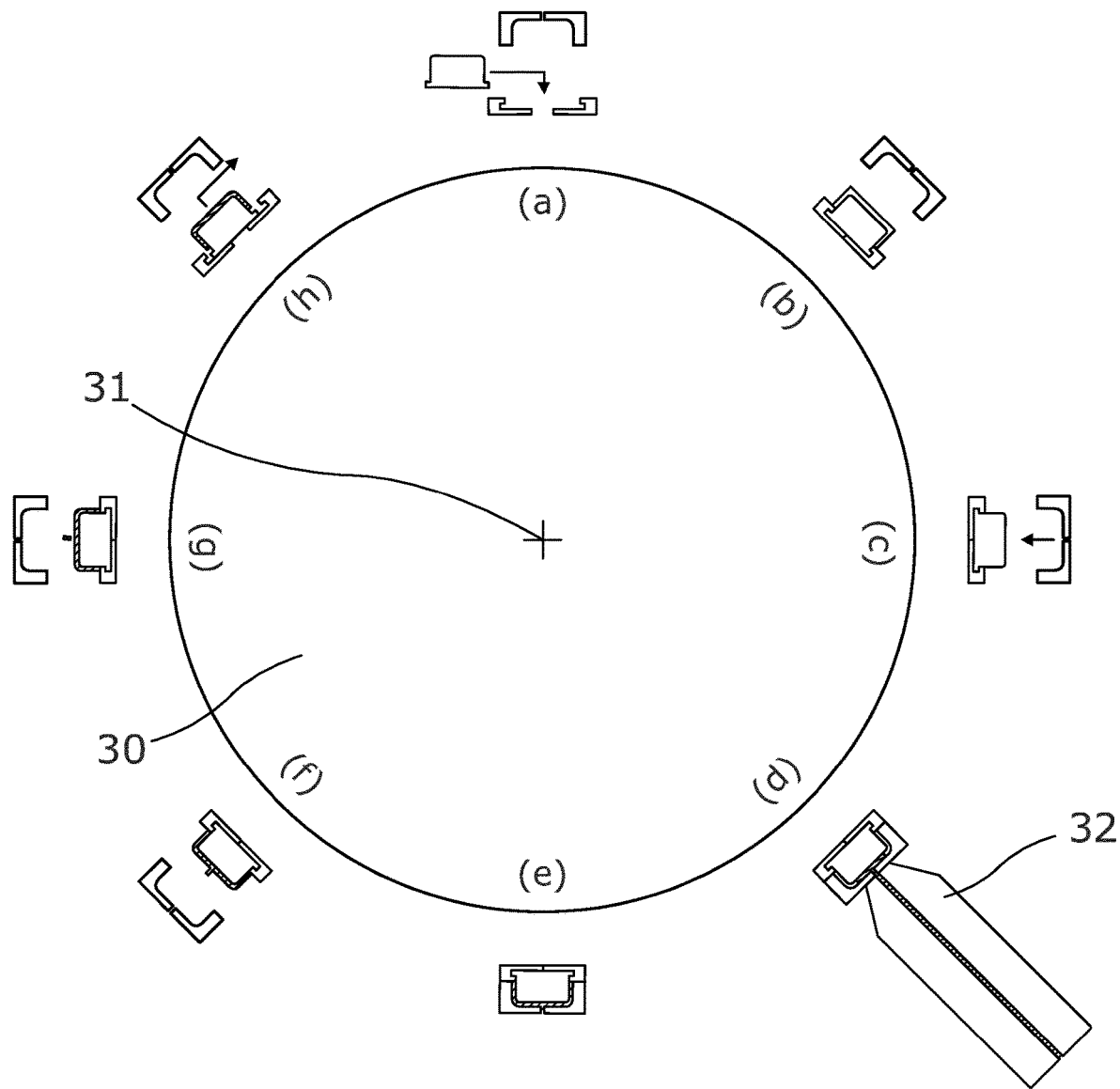
FIG. 4 shows a plan view of a rotary carousel which holds multiple mould stations of a construction described in FIG. 3.

FIG. 4 depicts a rotary carousel (30) which can be used in a production environment to economically manufacture many shaped foam articles at a fast production rate in accordance with the present invention. An extrusion foam moulding station with the essential features described in FIG. 3 is positioned at each station (a) to (h) on the carousel. The carousel rotates about its centre (31) to move each moulding station successively into contact with the extruder die (32) which is in a fixed position. At each station a different part of the moulding operation is taking place, so that continuous throughput is achieved. The moulding cycle begins at Station (a) where an insert (if used) is positioned into the core part of the tool which is split in this example in order to clamp the insert in place. The core and cavity parts of the tool are heated to the required temperature at Station (b) and Station (c). At Station (b) the infrared heating element is brought into close proximity to the insert in order to heat the surface of the insert to the required temperature. At Station (c) the core component is moved inside the cavity component in order to close the mould cavity. At Station (d) the mould is brought into contact with the extruder die and held in this position for the time period required to fill the mould cavity with the required amount of foam polymer composition. The mould cavity fill time defines the cycling period of the carousel i.e. the time period between the carousel rotating by one increment to bring the next tool station into contact with the extruder die. This time period shall preferably be no greater than the mould fill time plus the time it takes to cycle the carousel and move the mould into contact with extruder die at the beginning of the mould fill stage and then move the mould away from the extruder die at the end of the mould fill stage. Any time additional to this in the chosen cycle time results in additional scrap foam polymer composition which will be purged from the extruder die in the time a mould tool is not in contact with it. At Station (e) the mould and mould cavity surface are cooled. At Station (f) the core part of the tool is removed from the cavity to expose the moulded shaped foam article inside. The sprue is removed from the shaped foam article optionally at Station (g) using a cutting tool maneuvered along the correct path to successfully separate it from the shaped foam article. At Station (h) the insert assembly over-moulded with shaped foam article in accordance with the present invention is removed from the core part of the tool. The example in FIG. 4 shows the minimum number of stations of eight required for the present invention if using an insert to be over-moulded. It will be apparent to those skilled in the art that the actual number of stations required is dependent on the time taken to heat tool components to the required temperature, heat insert components to the required temperature and cool tool components cavity surface and shaped foam article to the required temperature for removal of the shaped foam article from the tool after moulding. If any of these three time periods is greater than the required mould fill time, additional stations would be required in order to accommodate that time without extending the carousel cycling period and would lead to additional scrap foam polymer composition from purging. For example, if the time required to heat tool components was 60 seconds, the time required to heat insert was 30 seconds the mould fill time was 15 seconds and the cooling time was 60 seconds then fourteen stations in total would be required. In this way, mould heating would be conducted over four stations instead of the two stations depicted in FIG. 4, insert heating would be conducted over two stations instead of the one currently depicted and cooling would be conducted over four stations instead of the one currently depicted giving a requirement for an additional six stations over the eight depicted in FIG. 4. In this example, the carousel would cycle every 15 seconds.

Figure 5:
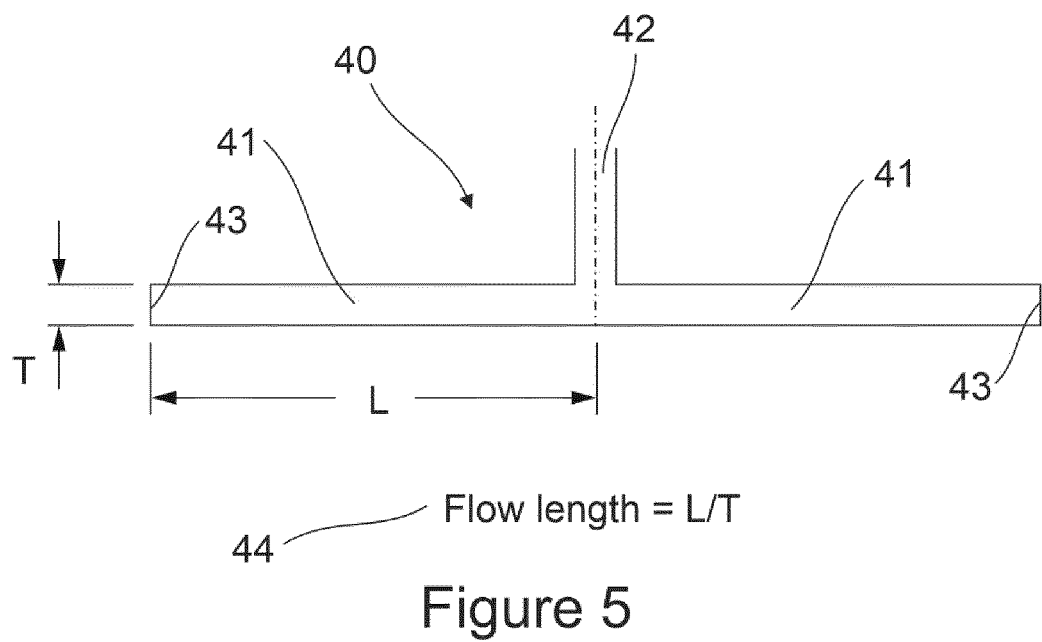
FIG. 5 shows a cross section of an example plate mould cavity used to describe the flow length ratio.
Figure 6:
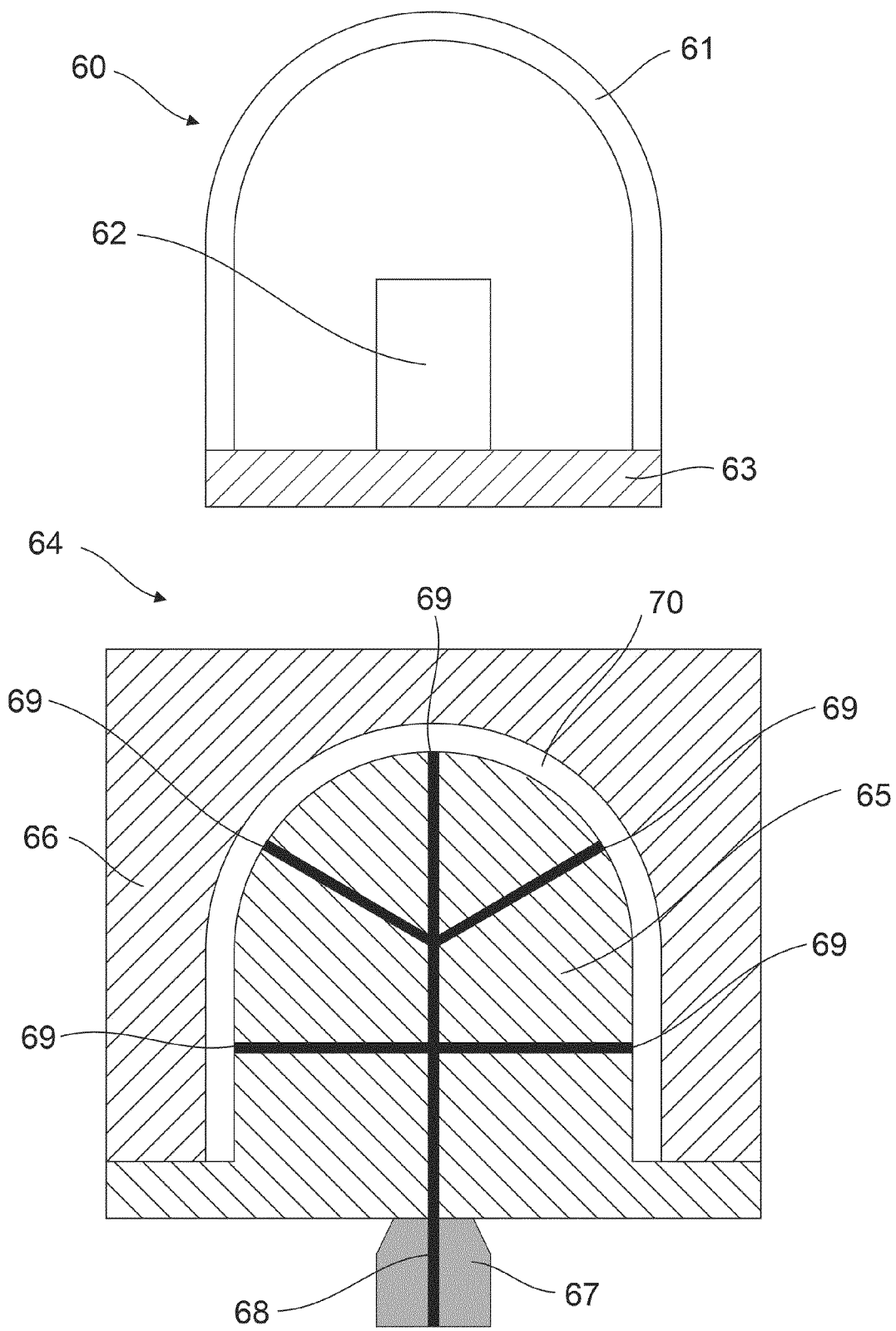
FIG. 6 shows the cross section of a radome structure made from a polymer foam which can be made in accordance with the present invention and a mould tool architecture to mould the radome in accordance with the present invention.

FIG. 5 shows the cavity surface outline of a simple plate mould cavity. The gate of the tool (42) through which foam polymer composition enters the mould cavity (41) according to the present invention is positioned at the centre of the part as is typical with such mould configurations. Foam polymer composition according to the present invention therefore flows from the gate (42) to the part of the cavity surface (43) furthest from the gate in order to fully fill the mould cavity and form the shaped article. The distance the foam polymer composition must therefore flow is L. The section thickness of the cavity and resulting shaped article T defines the cross sectional area through which the foam polymer composition must flow. The longer the flow length L, the greater the force the extruder must exert on the foam polymer composition to overcome the viscous forces within the polymer volume in order to shear it and continue to move the foam polymer composition into the mould. The greater the section thickness T, the greater the surface area over which that force is distributed and so the lower the pressure within the foam polymer composition. This leads to greater pressure within the foam polymer composition for increasing flow length L or decreasing section thickness T. As a maximum pressure can be exerted on the foam polymer composition before it becomes greater than the expansion pressure exerted by the blowing agent and inadequate void formation this leads to a flow length ratio (44) which should not be exceeded in the method according to the present invention if shaped foam articles with adequately low density and controlled void homogeneity throughout the volume of the shaped foam article are to be realised. As the component section thickness decreases, the flow length ratio increases and it has been found in accordance with the present invention that the method may be limited to a section thickness of approximately 1.6 mm in a 60 mm diameter centre gated part (a flow length ratio of 18.75). Homogeneity increases with increasing section thickness (and decreasing flow length ratio) and the density and dielectric constant reduction over the host polymer increases.

The flow length ratio limitation means that large shaped foam articles made in accordance with the present invention would preferentially use mould tool architectures with multiple gate locations to feed foam polymer composition into the cavity at multiple locations around the cavity surface. In this manner, multiple flow fronts may spread out from these gate locations and meet to form a contiguous part in which no flow front is required to travel as large a distance as the entire length of the shaped article. In this way, flow length ratio can be reduced and conveyance forces required to fill the tool can be minimized, void homogeneity can be optimized and lower shaped foam article densities can be achieved than would be possible with a single gate location. FIG. 7 shows a typical radome structure (60) which is a technology for which the present invention could be used. The radome (61) is manufactured from a shaped foam article made according to the present invention and is used to protect the radio frequency sensor (62) inside which is typically mounted to an underlying sub-structure (63). Radomes are typically required to be large area structures which would require larger flow length ratios and could be difficult to mould using the present invention. The mould architecture (64) to mould this radome would preferentially benefit from multiple gate locations around the cavity surface (69) through which to convey foam polymer composition (68) into the mould cavity (70). Preferentially, the core part of the tool (65) is permanently sited at the extruder die (67) and is engineered to form part of the extruder die to ensure the temperature and pressure of the foam polymer composition may be controlled between the extruder die (67) and the mould cavity (70). The cavity component (66) is preferentially the mobile component moved away from the core (65) and extruder die (67) in order to open and close the mould cavity and cycle tools to/from the extruder die.

EXAMPLES

A 60 mm by 1.6 mm disk component was moulded using a Prism TSE 16 twin screw extruder. This has a screw diameter of 16 mm and a screw flight depth of 3.5 mm. The die diameter was 6 mm. The tool core and cavity components were machined from EN24T steel and heated using cartridge heaters controlled by K-type thermocouples (incorporated into the volume of the tool) and Process Integral Differential (PID) digital controller on a feedback circuit. The infrared heating element was manufactured by Ceramicx product code SFEH and connected to a variable current power supply. The sliding rail tool was designed and manufactured by the present inventors to the design depicted in FIG. 3. It was built using Rexrooth aluminium sections and used pneumatic actuators to control all moveable tool parts. The sliding rail tool was a single station system and a rotary carousel was not employed in this example.

A formulation of 10% by mass Nouryon Expancel 980MB120 and 90% by mass Dow 25055E pellets were tumble mixed and added to the extruder feed hopper. Dow 25055E is the host polymer in this example and is a HDPE with a melting temperature of 124° C. 980MB120 is a grade of polymer microsphere in pelletised masterbatch form consisting of 65% by mass ethylene vinyl acetate (EVA).

All three zones of the extruder barrel were set to a temperature of 210° C. The extruder was thoroughly purged before the moulding process began to remove any Expancel which had been thermally damaged due to residence time in the extruder barrel. The extruder was set to a screw speed of 53 rpm and set to run continuously whilst the tool was prepared. The insert used in this test was a 4 mm thick by 60 mm diameter disk of Dow 25055E injection moulded in a separate process. The core tool was set to 80° C., the insert disk was pre-heated to 80° C. for 60 minutes in a convection oven. The cavity half of the tool was heated to 140° C. The infrared element was pre-heated using a power of 250 watts for 10 minutes, resulting in an estimated stabilised surface temperature of 390° C.

The insert disk was removed from the oven and immediately manually positioned into a 60 mm diameter matched recess in the core tool component and held in place by the interference fit. The infrared heating element was positioned over the insert disk at a distance of 5 cm between the surface of the insert and surface of the infrared element for a time of 5 seconds. Once this time period had elapsed the infrared element was moved away from the insert. The core was immediately closed into the cavity component and both components clamped against the extruder die with a compression pressure of 10 bar. The mould was filled for 9 seconds after which the core and cavity were removed from the extruder and the core and cavity heating elements disengaged. A compressed air supply was then passed through cooling channels in the tool to cool the core and cavity components for a period of 3 minutes before the foam over moulded disk was ejected. A foam density of 450 kg/m$^3$ was achieved which resulted in a dielectric constant of 1.6.

Inspection of the surface of the disk section clearly showed that the void structure was similar throughout the sample, thus demonstrating that the method according to the present invention can be used to mould shaped foam articles with zero or negligible skin of high density or solid host polymer.

The person skilled in the art realises that the present invention is by no means limited to the preferred embodiments described above. On the contrary, many modifications and variations are possible within the scope of the appended claims.

The invention claimed is:

1. A method of forming a shaped foamed polymer article in a mould tool system from a polymer composition, wherein:
    said polymer composition comprises a polymer and a foaming agent;
    said mould tool system comprises a core part and a cavity part;
    said core part and cavity part are engaged with one another to form a mould cavity;
    a polymer insert is located in the mould cavity;
    further wherein said method comprises:
    heating the polymer composition to a temperature at or above the melting temperature of the polymer composition to form a foamed polymer composition;
    heating the mould cavity to a temperature at or above the melting temperature of the foamed polymer composition;
    heating a surface layer of the polymer insert to a temperature which is at or greater than a melting temperature of the polymer insert;
    feeding the heated foamed polymer composition into the mould cavity such that the heated foamed polymer composition is overmoulded on to the polymer insert while the surface layer of the polymer insert is at or above the melting temperature;
    cooling the mould cavity to a temperature below the melting temperature of the foamed polymer composition.

2. The method according to claim 1, wherein the volume of said mould cavity; may be varied by moving one or both of the core part and the cavity part relative to each other; or is fixed during the formation of the shaped foamed polymer article.

3. The method according to claim 1, wherein the heated foamed polymer composition is fed into the mould cavity at a controlled rate.

4. The method according to claim 1, wherein:
    the heated foamed polymer composition is fed into the mould cavity via or through an opening or gate in an external surface of the mould tool system, wherein said opening or gate connects to the mould cavity; and the opening or gate connects with the mould cavity at a single location, or wherein the opening or gate connects with the mould cavity at more than one location.

5. The method according to claim 1, wherein:
    the heated foamed polymer composition is fed into the mould cavity via or through an opening or gate in an external surface of the mould tool system, wherein said opening or gate connects to the mould cavity;
    the opening or gate connects with the mould cavity at a single location, or wherein the opening or gate connects with the mould cavity at more than one location; and
    the opening or gate connects with the mould cavity at more than one location and wherein the opening or gate is split into a number of different paths which allow the heated foamed polymer composition after entering the mould tool system to form more than one flow front and wherein said flow fronts meet to form a contiguous part in the mould cavity.

6. The method according to claim 1, wherein the pressure of the heated foamed polymer composition is controlled, for example by controlling the flow length, wherein the flow length is the length the heated foamed polymer composition must flow from the opening or gate to the furthest location in the mould cavity from said opening or gate, and said length is divided by the section thickness along said flow length.

7. The method according to claim 1, wherein the heated foamed polymer composition prior to being fed into the mould tool system is extruded from an extruder.

8. The method according to claim 1, wherein the heated foamed polymer composition prior to being fed in to the mould tool is extruded from an extruder and wherein said extruder comprises a main body and a barrel through which the heated foamed polymer composition is extruded and the heated foamed polymer composition exits said extruder from an exit opening of the barrel of the extruder and enters the mould tool system.

9. The method according to claim 1, wherein:
    the heated foamed polymer composition prior to being fed in to the mould tool is extruded from an extruder and wherein said extruder comprises a main body and a barrel through which the heated foamed polymer composition is extruded and the heated foamed polymer composition exits said extruder from an exit opening of the barrel of the extruder and enters the mould tool system; and
    the extruder is buttressed up against the mould tool system so that the exit opening of the barrel of the extruder is flush with the opening in the mould tool system.

10. The method according to claim 1, wherein:
    the heated foamed polymer composition prior to being fed into the mould tool system is extruded from an extruder; and
    prior to the extruder and mould tool system being brought into contact to allow heated foamed polymer composition to flow into the mould cavity or gate of the mould tool system, an amount of heated foamed polymer composition is purged from the exit opening of the extruder.

11. The method according to claim 1, wherein:
    the heated foamed polymer composition prior to being fed into the mould tool system is extruded from an extruder; and
    the gate of the mould tool system and the exit opening of the extruder self-align when the mould tool system and extruder are brought into contact with one another.

12. The method according to claim 1, further comprising removing or releasing the article from the mould cavity.

13. The method according to claim 1, wherein the shaped article has a sprue and said sprue is removed from the shaped article, e.g. by cutting.

14. The method according to claim 1, wherein:
the polymer insert is not an integral part of the mould tool system, or wherein the polymer insert forms at least a part of the core part of the mould tool system, or wherein the core part comprises a recess in which to accommodate said insert.

15. The method according to claim 1, wherein:
the polymer insert and the heated foamed polymer composition which is overmoulded on to said polymer insert are the same polymer material or they are different polymer materials.

16. The method according to claim 1, wherein:
the insert polymer has a geometric feature or features present thereon which allow it to form a connection and remain in contact with the heated foamed polymer composition which is overmoulded.

17. The method according to claim 1, wherein atmospheric gas within the cavity mould is expelled from the cavity mould prior to and/or during formation of the shaped foamed polymer article.

18. The method according to claim 1, wherein the mould tool system is comprised in a foam moulding station, wherein the core part and cavity part are secured to a sliding bearing rail which allows said core and cavity parts of said mould tool system to move towards or away from each other either independently of each other or collectively as a single unit, and/or towards or away from a source of the heated foamed polymer composition.

19. The method according to claim 1, wherein:
the mould tool system is comprised in a foam moulding station, wherein the core part and cavity part are secured to a sliding bearing rail which allows said core and cavity parts of said mould tool system to move towards or away from each other either independently of each other or collectively as a single unit, and/or towards or away from a source of the heated foamed polymer composition; and
a number of the foam moulding stations are comprised on a rotary tool arrangement.

20. The method according to claim 1, wherein:
the mould tool system is comprised in a foam moulding station, wherein the core part and cavity part are secured to a sliding bearing rail which allows said core and cavity parts of said mould tool system to move towards or away from each other either independently of each other or collectively as a single unit, and/or towards or away from a source of the heated foamed polymer composition;
a number of the foam moulding stations are comprised on a rotary tool arrangement; and
the rotary tool arrangement is in the form of a rotary circular, or substantially circular, carousel and said moulding stations are positioned at regular points around the circumference or edge of said carousel.

21. The method according to claim 1, wherein:
the mould tool system is comprised in a foam moulding station, wherein the core part and cavity part are secured to a sliding bearing rail which allows said core and cavity parts of said mould tool system to move towards or away from each other either independently of each other or collectively as a single unit, and/or towards or away from a source of the heated foamed polymer composition;
a number of the foam moulding stations are comprised on a rotary tool arrangement; and
a different part of the moulding operation takes place at each moulding station.

22. The method according to claim 1, wherein the foaming agent comprises or consists of a polymer shell encapsulating a gas or liquid.

23. The method according to claim 1, wherein:
the foaming agent comprises or consists of a polymer shell encapsulating a gas or liquid; and
the temperature of the mould cavity is above a critical onset temperature of the polymer shell which causes the polymer shell to soften and expand, and below the maximum expansion temperature of the polymer shell which causes the polymer shell to burst.

24. The method according to claim 1, wherein the volume of the mould cavity is kept fixed while the heated foamed polymer composition is fed into the mould cavity and the heated foamed polymer composition is partially foamed when it first enters the mould cavity.

25. The method according to claim 1, wherein the shaped foamed polymer article is a single piece.

26. A shaped foamed polymer article obtainable from a method in accordance with claim 1.

* * * * *